United States Patent
Tachi

(10) Patent No.: US 10,382,604 B2
(45) Date of Patent: Aug. 13, 2019

(54) IMAGE PROCESSING APPARATUS, CONTROL METHOD THEREOF, AND NON-TRANSITORY COMPUTER-READABLE STORAGE MEDIUM

(71) Applicant: CANON KABUSHIKI KAISHA, Tokyo (JP)

(72) Inventor: Daiki Tachi, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 57 days.

(21) Appl. No.: 15/658,753

(22) Filed: Jul. 25, 2017

(65) Prior Publication Data
US 2018/0041619 A1 Feb. 8, 2018

(30) Foreign Application Priority Data
Aug. 2, 2016 (JP) .................................. 2016-152291

(51) Int. Cl.
*H04M 1/2745* (2006.01)
(52) U.S. Cl.
CPC ............. *H04M 1/274516* (2013.01); *H04M 1/274533* (2013.01); *H04M 1/274566* (2013.01)
(58) Field of Classification Search
CPC ..... H04M 1/274516; H04M 1/274533; H04M 1/274566

USPC .............. 379/100.1, 100.15–100.17, 355.03, 379/100.01, 251, 258
See application file for complete search history.

(56) References Cited

U.S. PATENT DOCUMENTS 5,410,539 A * 4/1995 Ikeno ..................... H04Q 3/627
370/385
2016/0191725 A1* 6/2016 Hama ................ H04N 1/00214
358/1.15

FOREIGN PATENT DOCUMENTS

JP 2012178625 A 9/2012

* cited by examiner

*Primary Examiner* — Hemant S Patel
(74) *Attorney, Agent, or Firm* — Venable LLP

(57) ABSTRACT

An image processing apparatus performs export by switching, based on the communication type of one or more pieces of stored destination information of an external apparatus, whether or not to add an external line call number to a destination number included in the destination information. The image processing apparatus also performs, with respect to destination information obtained from the external apparatus, import of the destination information to the image processing apparatus by switching, based on a communication type regarding the destination information, whether or not to remove an external line call number from a destination number included in the destination information.

7 Claims, 11 Drawing Sheets

IMAGE PROCESSING APPARATUS, CONTROL METHOD THEREOF, AND NON-TRANSITORY COMPUTER-READABLE STORAGE MEDIUM

BACKGROUND OF THE INVENTION

Field of the Invention

The present invention relates to an image processing apparatus which transmits image data, a control method thereof, and a non-transitory computer-readable storage medium.

Description of the Related Art

Conventionally, it is known that an image processing apparatus utilizes a destination table which manages the destinations of phone numbers, folder paths, and the like to perform FAX transmission, I-FAX (Internet FAX) transmission, or file transmission of image data read by a scanner. File transmission refers to a service which transmits the image data by, for example, a transmission protocol such as an SMB (Server Message Block) or an FTP (File Transfer Protocol).

There is a function of adding a preset external line call number (for example, '0') automatically when FAX transmission is performed on an image processing apparatus connected to a general subscriber telephone line. Further, such an image processing apparatus includes an apparatus capable of exporting data in the destination table to a PC or the like and registering the data in the destination table in another image processing apparatus having an import function. Japanese Patent Laid-Open No. 2012-178625 proposes a technique of, when importing destination information from an external apparatus, preventing a transmission error by loading destination information to which an external line access code is added or information to which the external line access code is not added in accordance with the connection type of a self apparatus, for example, whether it is extension line connection or external line connection.

However, the above-described related art includes a problem to be described below. In the installation environment of the image processing apparatus, imported destination data may not be available intact. A case will be considered in which, for example, destination data is exported from an apparatus which adds an external line call number (external line access code) automatically and is imported to an image processing apparatus which does not add the external line call number automatically. In this case, the external line call number is not added if FAX transmission is performed by utilizing a registered phone number, causing a transmission error that image data is transmitted by facsimile to an unintended destination.

A case will also be considered in which destination data is exported from the image processing apparatus which does not add the external line call number automatically and is imported to the image processing apparatus which adds the external line call number automatically. In this case, the external line call number has already been added to the imported destination data, and the external line call number is further added automatically, adding the external line call number twice and causing a transmission error.

SUMMARY OF THE INVENTION

The present invention enables realization of preventing transmission error by switching control when destination data is exported or imported in accordance with whether an apparatus which exports the destination data or an apparatus which imports the destination data is an apparatus which adds an external line call number automatically.

One aspect of the present invention provides an image processing apparatus communicable with an external apparatus, the apparatus comprising: a storage unit configured to store at least one piece of destination information of the external apparatus; and an export unit configured to export, to the external apparatus, destination information stored by the storage unit by switching, based on a communication type of the destination information, whether or not to add an external line call number to a destination number included in the destination information.

Another aspect of the present invention provides an image processing apparatus communicable with an external apparatus, the apparatus comprising: an obtaining unit configured to obtain, from the external apparatus, at least one piece of destination information of the external apparatus; and an import unit configured to import, to the image processing apparatus, destination information obtained by the obtaining unit by switching, based on a communication type of the destination information, whether or not to remove an external line call number from a destination number included in the destination information.

Still another aspect of the present invention provides a method for controlling an image processing apparatus communicable with an external apparatus and including a storage unit configured to store at least one piece of destination information of the apparatus, the method comprising: exporting, to the external apparatus, destination information stored by the storage unit by switching, based on a communication type of the destination information, whether or not to add an external line call number to a destination number included in the destination information.

Yet still another aspect of the present invention provides a method for controlling an image processing apparatus communicable with an external apparatus, the method comprising: obtaining, from the external apparatus, at least one piece of destination information of the external apparatus; and importing, to the image processing apparatus, destination information obtained in the obtaining by switching, based on a communication type of the destination information, whether or not to remove an external line call number from a destination number included in the destination information.

Still yet another aspect of the present invention provides a non-transitory computer-readable storage medium storing a computer program that causes a computer to execute respective steps in a method for controlling an image processing apparatus communicable with an external apparatus and including a storage unit configured to store at least one piece of destination information of the apparatus, wherein the method includes: exporting, to the external apparatus, destination information stored by the storage unit by switching, based on a communication type of the destination information, whether or not to add an external line call number to a destination number included in the destination information.

Yet still another aspect of the present invention provides a non-transitory computer-readable storage medium storing a computer program that causes a computer to execute respective steps in a method for controlling an image processing apparatus communicable with an external apparatus, wherein the method includes: obtaining, from the external apparatus, at least one piece of destination information of the external apparatus; and importing, to the image processing apparatus, destination information obtained in the obtaining by switching, based on a communication type of the destination information, whether or not to remove an external line call number from a destination number included in the destination information.

Further features of the present invention will be apparent from the following description of exemplary embodiments with reference to the attached drawings.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

<System Arrangement>

Figure 1:
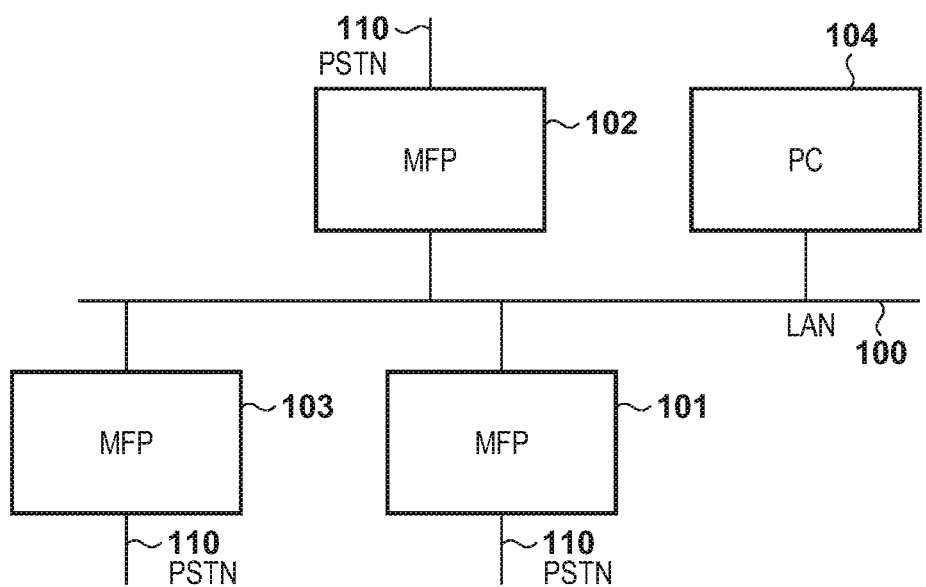
FIG. 1 is a diagram showing an overall image processing system according to an embodiment.

The first embodiment of the present invention will be described below. First, the overall arrangement of an image processing system according to this embodiment will be described with reference to FIG. 1.

On a LAN (Local Area Network) 100, a PC 104 and MFPs (Multifunction Peripheral) 101, 102, and 103 each serving as an image processing apparatus are communicably connected to each other. Note that the image processing system includes the MFPs 101, 102, and 103 and the PC 104. However, only the MFPs 101, 102, and 103, only the PC 104, or only the MFP 101 may also be referred to as the image processing system.

Setting a folder in the PC 104 as a destination, the MFPs 101, 102, and 103 can perform file transmission of image data by using an SMB or an FTP. In addition to the PC 104, the MFPs 101, 102, and 103 can further set a folder in a file server (not shown) as a destination.

The MFPs 101, 102, and 103 can also transmit the image data by email via a mail server (not shown). Furthermore, the MFPs 101, 102, and 103 are connected to a PSTN (Public Switched Telephone Network) 110, and can perform FAX transmission/reception among the MFPs 101, 102, and 103 or between FAX (facsimile) apparatuses (not shown). Each of the MFPs 101 and 102 adds an external line call number automatically when making an external line call by using the PSTN. On the other hand, the MFP 103 does not add the external line call number automatically.

<Arrangement of Image Processing Apparatus>

Figure 2:
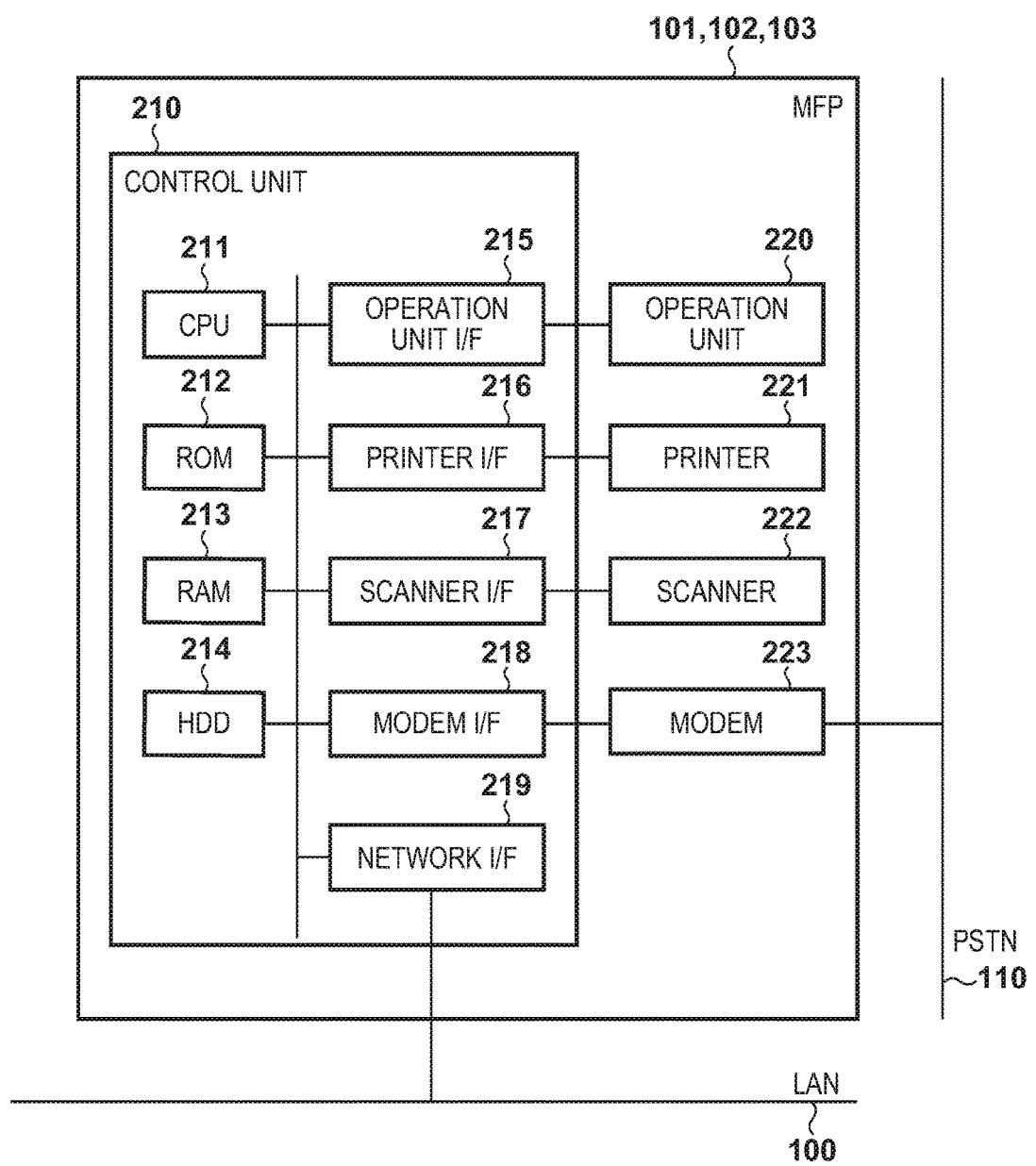
FIG. 2 is a block diagram showing the arrangement of MFPs 101, 102, and 103 according to the embodiment.

An example of the arrangement of the MFP 101 will now be described with reference to FIG. 2. Note that the MFPs 102 and 103 have the same arrangement as the MFP 101, and thus a description thereof will be omitted.

The MFP 101 includes a control unit 210, an operation unit 220, a printer 221, a scanner 222, and a modem 223. The control unit 210 includes a CPU 211, a ROM 212, a RAM 213, an HDD 214, an operation unit I/F 215, a printer I/F 216, a scanner I/F 217, a modem I/F 218, and a network I/F 219.

The control unit 210 which includes the CPU 211 generally controls the overall operations of the MFP 101. The CPU 211 performs various kinds of control such as reading control and transmission control by reading out control programs stored in the ROM 212. The RAM 213 is used as temporary storage areas such as a main memory and work area of the CPU 211. Note that in the case of the MFP 101, one CPU 211 executes processing shown in the flowcharts of FIGS. 7, 8, 10, and 12 to be described later by using one memory (the RAM 213 or the HDD 214). However, another mode may be adopted. For example, the processing shown in the flowcharts of FIGS. 7, 8, 10, and 12 can also be executed by cooperating a plurality of CPUs and a plurality of RAMs or HDDs with each other.

The HDD 214 stores image data and various programs. The operation unit I/F 215 connects the operation unit 220 and the control unit 210. The operation unit 220 includes a liquid crystal display unit having a touch panel function, a keyboard, and the like.

The printer I/F 216 connects the printer 221 and the control unit 210. Image data to be printed by the printer 221 is transferred from the control unit 210 via the printer I/F 216, and printed on a printing medium in the printer 221. The scanner I/F 217 connects the scanner 222 and the control unit 210. The scanner 222 reads an image on an original to generate image data (image file), and inputs the image data to the control unit 210 via the scanner I/F 217. The MFP 101 can perform file transmission or mail transmission of the image data (image file) generated by the scanner 222.

The modem I/F 218 connects the modem 223 and the control unit 210. The modem 223 connects the control unit 210 (MFP 101) and the PSTN 110. The modem 223 executes FAX transmission/reception with the FAX apparatus on the PSTN 110. The network I/F 219 connects the control unit 210 (MFP 101) to the LAN 100. The network I/F 219 transmits information or image data to an external apparatus (the MFP 102 or 103, the PC 104, or the like) on the LAN 100, or receives various kinds of information from the external apparatus on the LAN 100.

<PC Arrangement>

Figure 3:
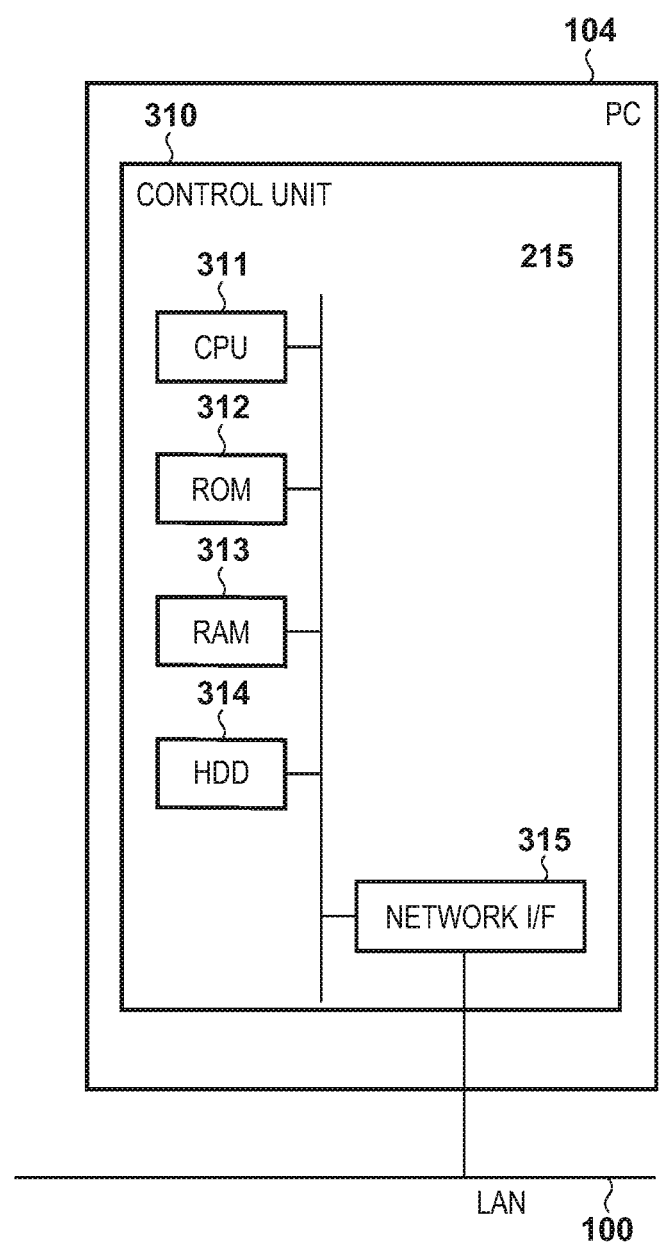
FIG. 3 is a block diagram showing the arrangement of a PC 104 according to the embodiment.

An example of the arrangement of the PC 104 will now be described with reference to FIG. 3. The PC 104 includes a control unit 310. The control unit 310 includes a CPU 311, a ROM 312, a RAM 313, an HDD 314, and a network I/F 315.

The control unit 310 which includes the CPU 311 generally controls the overall operations of the PC 104. The CPU 311 performs various kinds of control processing by reading out control programs stored in the ROM 312. The RAM 313 is used as temporary storage areas such as a main memory and work area of the CPU 311. The HDD 314 stores image data and various programs. The network I/F 315 connects the control unit 310 (PC 104) to the LAN 100. The network I/F 315 transmits/receives various kinds of information to/from another apparatus on the LAN 100.

<Screen Example>

Figure 4:
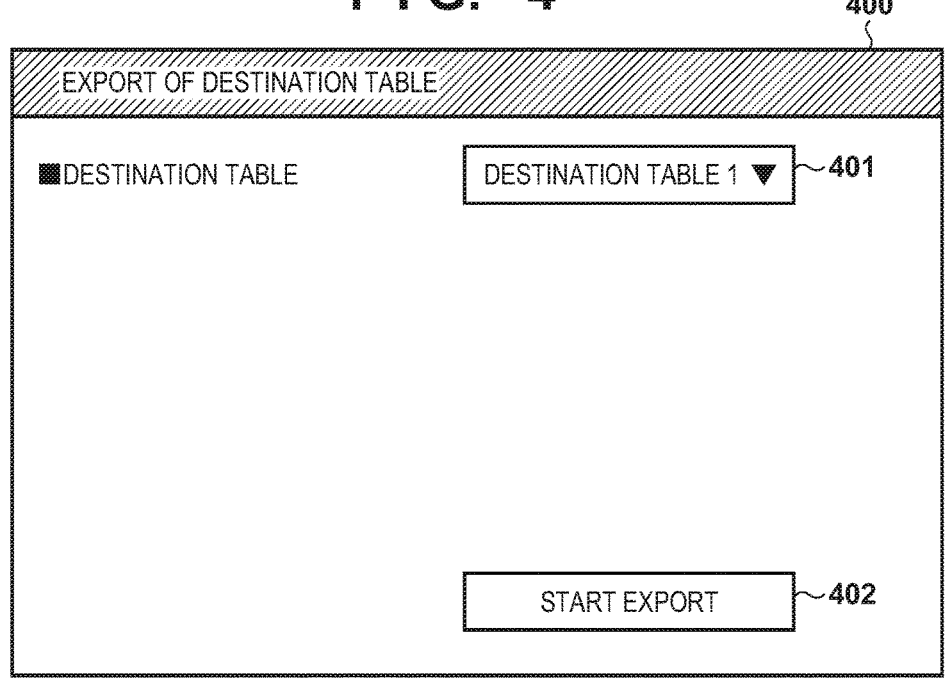
FIG. 4 is a view showing an operation screen of the MFP 101 according to the embodiment.

Examples of operation screens displayed in the display unit of the PC 104 will be described below. FIG. 4 shows an example of the operation screen on which destination table data is exported from the MFP 101. An operation screen 400 is a screen for operating the MFP 101 remotely via the LAN 100 by using a browser mounted on the PC 104. At least information 401 and an operation key 402 are displayed on the operation screen 400.

The information 401 selects the destination table data to be exported. It is possible, in the MFP 101, to register ten sets of destination tables and select at least one destination table out of destination tables 1 to 10. However, destination tables other than these may be included as choices. It is also possible to select a plurality of destination tables simultaneously. A user can select desired destination table data from choices displayed in a drop-down form.

The operation key 402 starts to execute the export of the destination table data. Upon selecting the operation key 402, the destination table data stored in the HDD 214 of the MFP 101 is exported and saved in the PC 104. Note that a case in which an export instruction is executed for each of the MFPs 102 and 103 is also the same, and thus a description thereof will be omitted.

Figure 5:
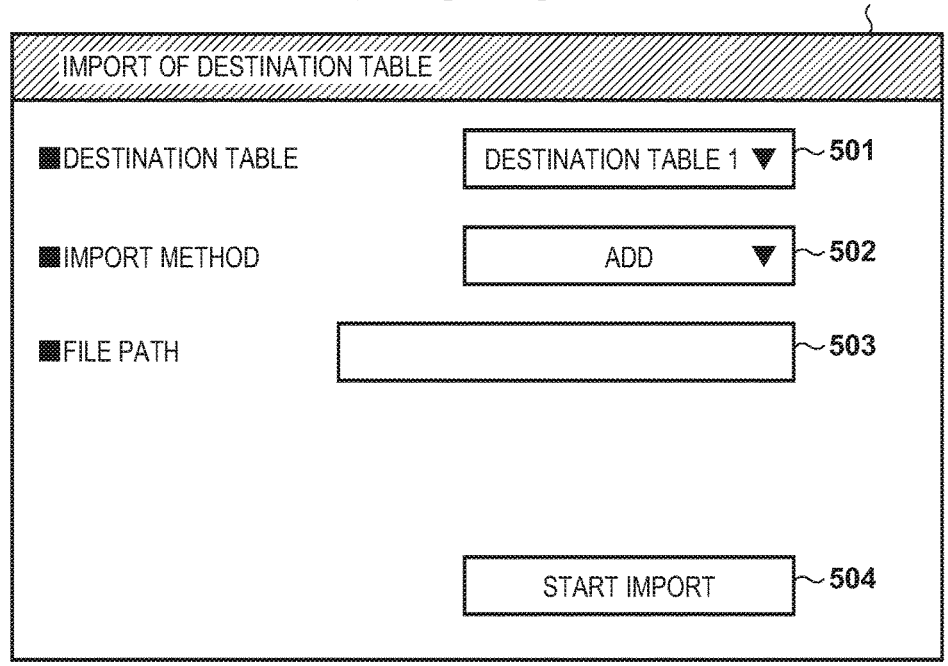
FIG. 5 is a view showing an operation screen of the MFP 101 according to the embodiment.

FIG. 5 shows an example of the operation screen on which the destination table data is imported from the MFP 101. An operation screen 500 is a screen for operating the MFP 101 remotely via the LAN 100 by using the browser mounted on the PC 104. At least information 501, 502, and 503 and an operation key 504 are displayed on the operation screen 500.

The information 501 selects the write destination of the destination table data to be imported. It is possible, in the MFP 101, to select at least one destination table out of destination tables 1 to 10. However, destination tables other than these may be included as choices. It is also possible to select a plurality of destination tables simultaneously. The user can select desired destination table data from choices displayed in the drop-down form.

The information 502 is an information key which selects a method for writing the destination table data to be imported. In the MFP 101, overwrite can be selected after addition or deletion. Upon selecting the addition, import data can be added after destination table data selected in the information 501 when the destination table data is imported. Upon selecting the overwrite after the deletion, the destination table data selected in the information 501 is deleted to add the import data.

The information 503 designates the path of the destination table data saved in the PC 104. The operation key 504 executes the import of the destination table data. Upon selecting the operation key 504, the destination table data saved in the PC 104 is imported to the destination table data stored in the HDD 214 of the MFP 101 in accordance with the setting of the information 502. Note that a case in which an import instruction is executed for each of the MFPs 102 and 103 is also the same, and thus a description thereof will be omitted.

Figure 6:
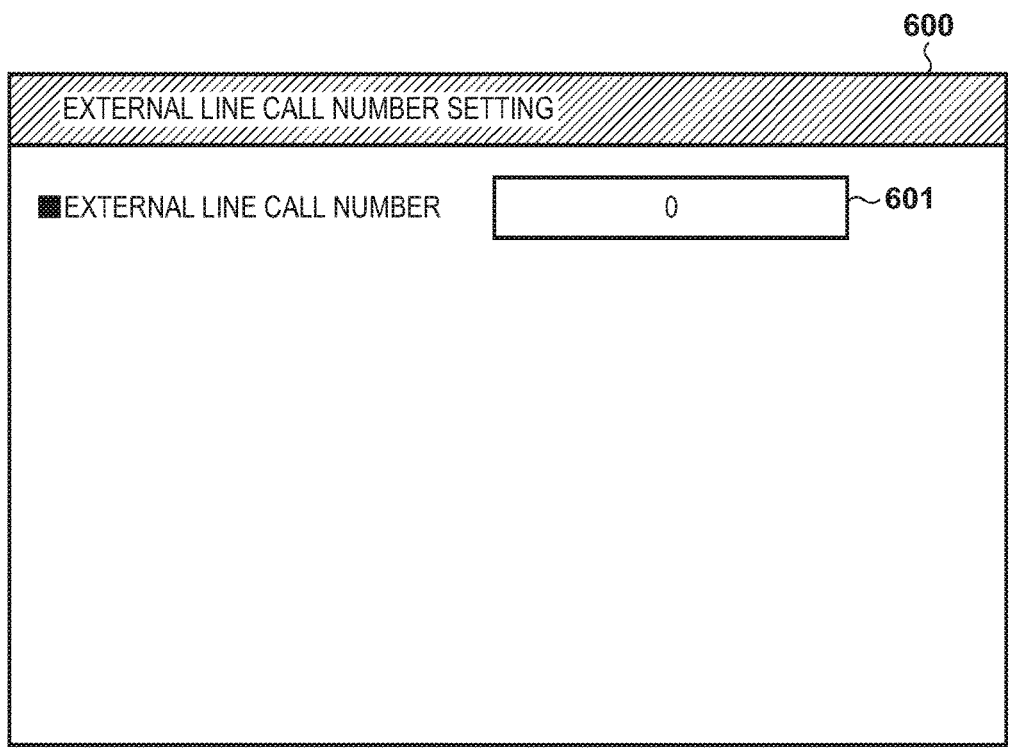
FIG. 6 is a view showing an operation screen of the MFP 101 according to the embodiment.

FIG. 6 shows an example of the operation screen displayed in the operation unit 220 of each of the MFPs 101 and 102. At least information 601 is displayed on an operation screen 600.

The information 601 indicates an external line call number added automatically when an external line is set in the line of destination table data. The number set in the information 601 is added to call at the time of external line transmission. In an example of FIG. 6, "0" is set as the external line call number. In this case, "0" is added automatically to a destination number to call at the time of external line transmission. Note that the MFP 103 is incompatible with the automatic addition of the external line call number, and thus this setting does not exist in the MFP 103.

<Destination Table Data>

Destination table data stored in the MFP 101 which adds an external line call number automatically and destination table data stored in the MFP 103 which does not add an external line call number automatically according to this embodiment will now be described. Table 1 shows an example of destination table data stored in the HDD 214 of the MFP 101.

TABLE 1

Destination Table Data (A00)

| Destination ID (A01) | Name (A02) | Protocol (A03) | Line (A04) | Destination (A05) |
|---|---|---|---|---|
| 001 | Suzuki | FAX | external line | 0311112222 |
| 002 | Tanaka | FAX | external line | 0344445555 |
| 003 | Sato | FTP | — | server.xyz.co.jp |

Information A01 uniquely indicates destinations managed in destination table data A00. Information A02 indicates the names of registered destinations. Information A03 indicates protocols used to transmit image data. Here, FAX transmission (facsimile transmission) or FTP transmission is set. Information A04 is information (communication type) which indicates whether a line used when the protocol is FAX is an extension line or an external line. Therefore, the information A04 is not set for data of FTP transmission. Information A05 is information for specifying a calling number or folder to be a transmission destination.

Table 2 shows an example of destination table data stored in the HDD 214 of the MFP 103.

TABLE 2

Destination Table Data (B00)

| Destination ID (B01) | Name (B02) | Protocol (B03) | Destination (B04) |
|---|---|---|---|
| 001 | Kato | FAX | 00366667777 |
| 002 | Yamada | FAX | 00388889999 |

Information B01 uniquely indicates destinations managed in destination table data B00. Information B02 indicates the names of registered destinations. Information B03 indicates a protocol used to transmit image data. Information B04 is information for specifying a calling number or folder to be a transmission destination. The MFP 103 does not add an external line call number automatically and thus is registered with an external line call number added to an external line destination. The MFP 103 does not contain information indicating whether a line is an external line or an extension line corresponding to the information A04, as the MFP 101.

<Export Processing Procedure>

Figure 7:
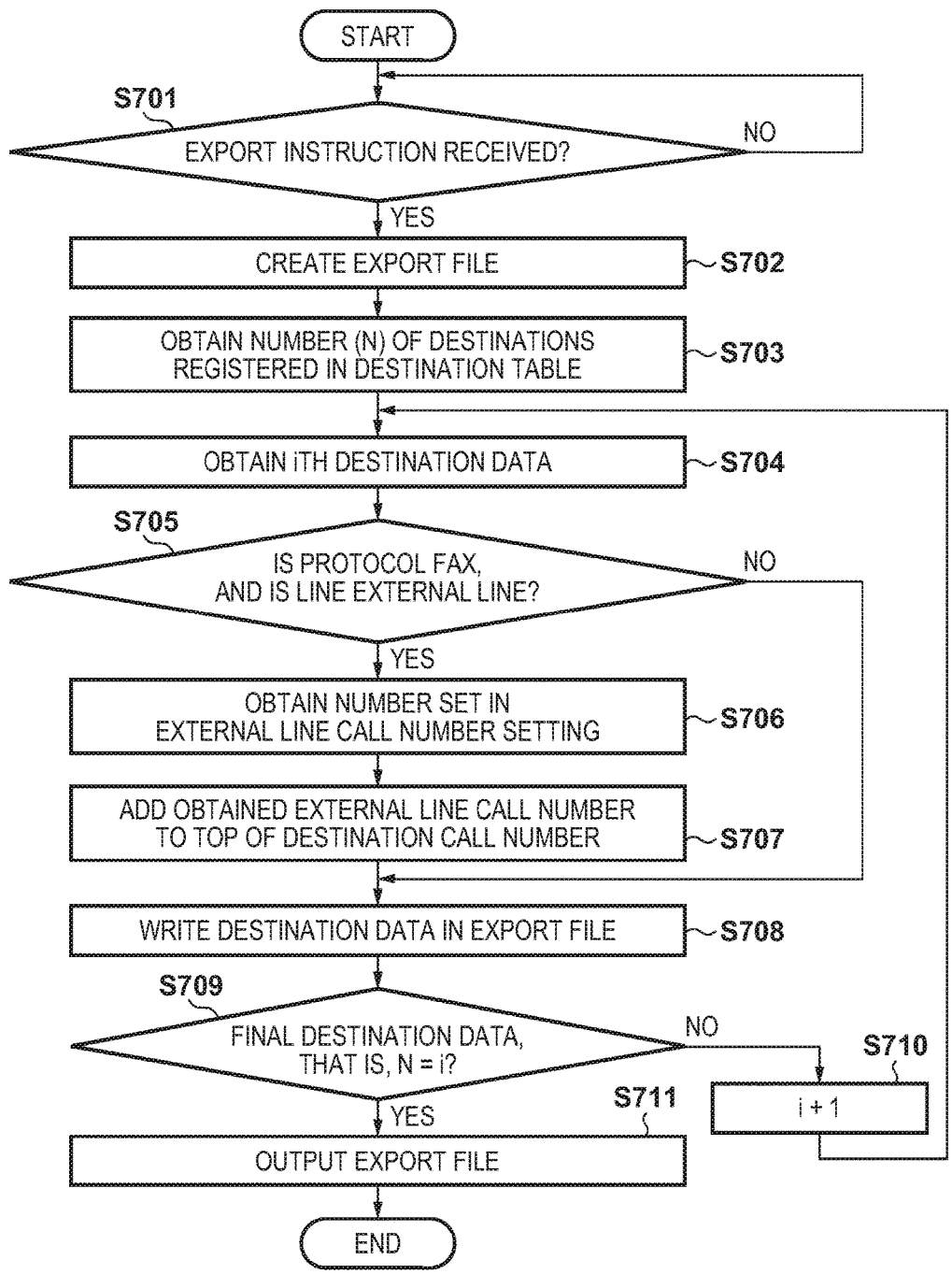
FIG. 7 is a flowchart showing the operation of the MFP 101 according to the embodiment.

A processing procedure for selecting the operation key 402 (start of export) in FIG. 4 to export the destination table data will now be described with reference to FIG. 7. Respective operations (steps) shown in the flowchart of FIG. 7 are implemented by, for example, causing the CPU 211 of the MFP 101 to execute the control programs stored in the HDD 214.

In step S701, the CPU 211 determines whether an export execution instruction is received from the user via the LAN 100 of the PC 104. Upon receiving the execution instruction, the process advances to step S702. In step S702, the CPU 211 creates an export file to be output to the PC 104, and then the process advances to step S703. At this time, no information is written in the export file. Information is written in a blank export file in the processing of steps S704 to S710 below. In step S703, the CPU 211 obtains the destination table data A00 saved in the HDD 214 and obtains the number of registrations thereof, and then the process advances to step S704. Here, the obtained number of registrations is N.

In step S704, the CPU 211 obtains the ith destination data from the destination table data obtained in step S703. i=1 when the processing in step S704 is executed for the first time. Upon obtaining the destination data, the process advances to step S705. In step S705, the CPU 211 determines whether the protocol of the destination data obtained in step S704 is FAX, and the line is an external line (communication type). If a condition is met, the process advances to step S706. If the condition is not met, the process advances to step S708.

In step S706, the CPU 211 obtains an external line call number (for example, "0") in the information 601 of FIG. 6 stored in the HDD 214. Upon obtaining the number, the process advances to step S707. In step S707, the CPU 211 adds the external line call number obtained in step S707 to the top of the destination A05 in the destination data obtained in step S704. Upon adding the external line call number, the process advances to step S708.

In step S708, the CPU 211 writes destination data in the export file created in step S702. Upon the completion of writing, the process advances to step S709. In step S709, the CPU 211 determines whether the obtained destination data is final destination data. If the obtained destination data is final data, that is, N=i, the process advances to step S711. If N>i, the process advances to step S710. In step S710, the CPU 211 increases the number (i+1) to obtain, and then the process returns to step S704.

On the other hand, if the obtained destination data is the final destination data, in step S711, the CPU 211 outputs the created export file to the PC 104 via the LAN 100 and terminates the processing of the flowchart. Note that a case in which the export instruction is executed for the MFP 102 is also the same, and thus a description thereof will be omitted. External line call number setting does not exist when the export instruction is executed for the MFP 103, skipping the processing from steps S705 to S707.

<Destination Table Data to be Exported>

Destination table data to be exported will now be described. Table 3 shows an example of destination table data described in the file exported from the MFP 101 to the PC 104 in step S711 described above of FIG. 7.

TABLE 3

| Destination Table Data (C00) | | | | |
|---|---|---|---|---|
| Destination ID (C01) | Name (C02) | Protocol (C03) | Line (C04) | Destination (C05) |
| 001 | Suzuki | FAX | external line | 00311112222 |
| 002 | Tanaka | FAX | external line | 00344445555 |
| 003 | Sato | FTP | — | server.xyz.co.jp |

Pieces of information C01 to C05, respectively, correspond to pieces of the information A01 to A05 described in Table 1. In the information C05, the external line call number ("0") is added, in step S707 described above of FIG. 7, to the destination C05 in which the protocol C03 is FAX, and the line C04 is an external line. Thus, an exported destination is standardized with a value to which the same external line call number is added both in the MFPs 101 and 102 each adding the external line call number automatically, and the MFP 103 which does not add the external line call number automatically. This is because in the MFP 103, an external number has already been added to the stored destination table data as needed, though the processing from steps S705 to S707 is skipped as described above.

<Import Processing Procedure>

Figure 8:
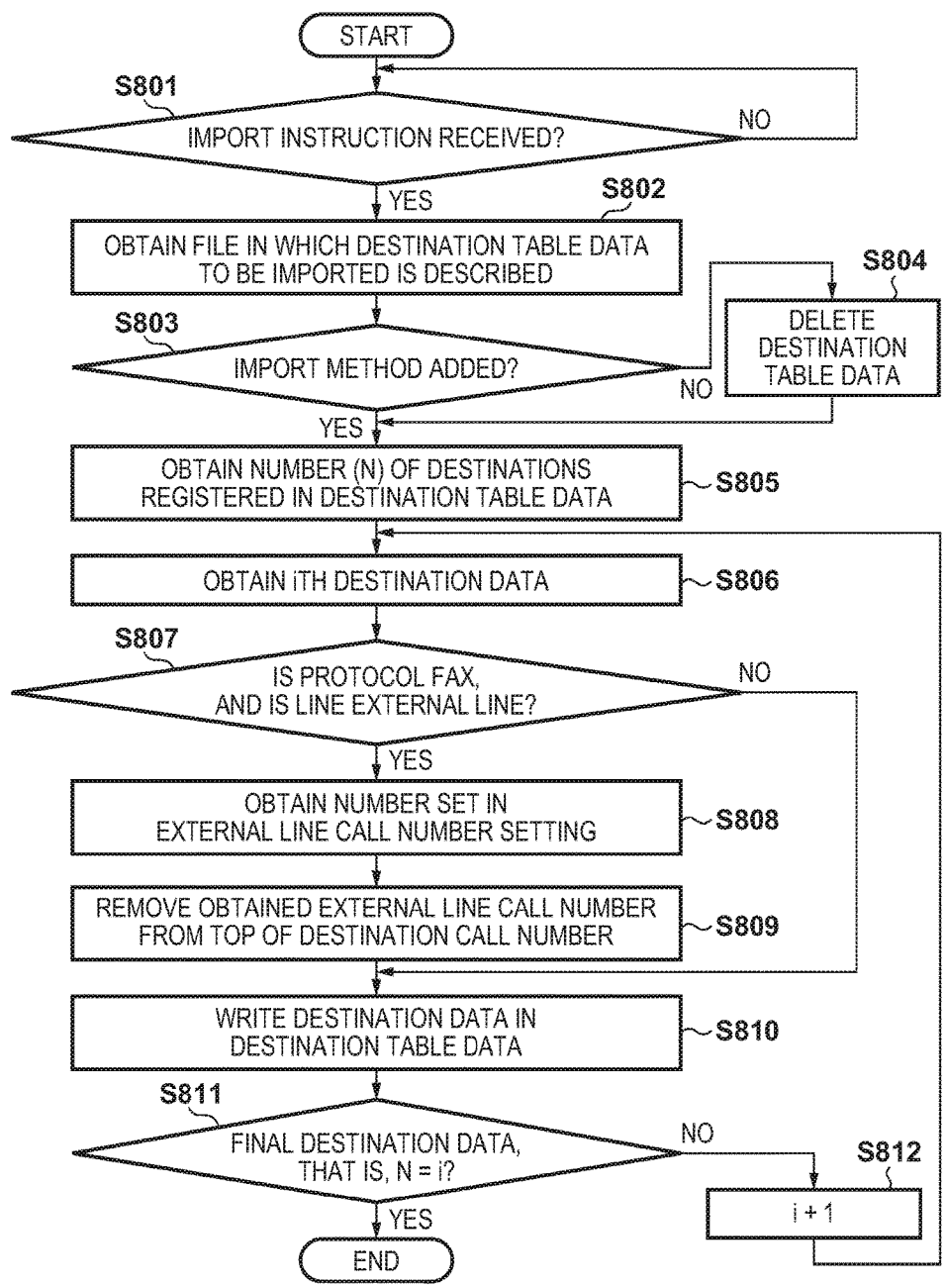
FIG. 8 is a flowchart showing the operation of the MFP 102 according to the embodiment.

A processing procedure when the operation key 504 of FIG. 5 is selected to import the destination table data will now be described with reference to FIG. 8. Here, a flowchart is shown when the destination data exported from the MFP 101 is imported to the MFP 102. Export and import functions are utilized when an MFP at the same position is replaced. Therefore, it can be considered that external line call numbers via an extension line are the same. Respective operations (steps) shown in the flowchart of FIG. 8 are implemented by, for example, causing the CPU 211 of the MFP 102 to execute the control programs stored in the HDD 214.

In step S801, the CPU 211 determines whether an import execution instruction is received from the user via the LAN 100 of the PC 104. Upon receiving the execution instruction, the process advances to step S802. In step S802, the CPU 211 obtains a file from a path set in the information 503 of FIG. 5 via the LAN 100 of the PC 104, and then the process advances to step S803.

In step S803, the CPU 211 obtains an import method set in the information 502 of FIG. 5. If the obtained setting is addition, the process advances to step S805. If the obtained setting is addition after deletion, the process advances to step S804.

In step S804, the CPU 211 deletes destination table data stored in the HDD 214 by the MFP 102, and then the process advances to step S805. In step S805, the CPU 211 obtains the number of destinations registered in the destination table data of the file obtained in step S802. Here, the number of registrations is N. Upon obtaining the number, the process advances to step S806. Subsequently, in step S806, the CPU 211 obtains the ith destination data from the destination table data obtained in step S802. i=1 when the processing in step S806 is executed for the first time. Upon obtaining the destination data, the process advances to step S807.

In step S807, the CPU 211 determines whether the protocol of the destination data obtained in step S806 is FAX, and the line is an external line (communication type). If these conditions are met, the process advances to step S808. If these conditions are not met, the process advances to step S810. In step S808, the CPU 211 obtains the external line call number ("0") in the information 601 of FIG. 6 stored in the HDD 214, and then the process advances to step S809. In step S809, the CPU 211 removes the external line call number obtained in step S808 from the top of the destination A05 in the destination data obtained in step S806, and then the process advances to step S810.

In step S810, the CPU 211 writes the obtained destination data or the destination data processed in step S809 in the destination table data stored in the HDD 214. Upon the completion of writing, the process advances to step S811. In step S811, the CPU 211 determines whether the obtained destination data is final destination data. If the obtained destination data is final data, that is, N=i, the processing of this flowchart ends. If N>i, the process advances to step S812.

In step S812, the CPU 211 increases the number (i+1) to obtain, and then the process returns to step S806. Note that a case in which the import instruction is executed for the MFP 101 is also the same, and thus a description thereof will be omitted. External line call number setting does not exist when the import instruction is executed for the MFP 103, skipping the processing from steps S807 to S809.

<Imported Destination Table Data>

Table 4 shows an example of a result of importing the destination table data in Table 3 to the MFP 102 in the flowchart of FIG. 8. Here, a case in which addition is selected after deletion in the setting of step S803 is given as an example.

TABLE 4

Destination Table Data (D00)

| Destination ID (D01) | Name (D02) | Protocol (D03) | Line (D04) | Destination (D05) |
|---|---|---|---|---|
| 001 | Suzuki | FAX | external line | 0311112222 |
| 002 | Tanaka | FAX | external line | 0344445555 |
| 003 | Sato | FTP | — | server.xyz.co.jp |

Table 5 shows an example of the result of importing the destination table data in Table 3 to the MFP 103 in the flowchart of FIG. 8. Here, a case in which addition is selected in the setting of step S803 is given as an example. Therefore, unlike Table 4, newly imported destination data (003 to 005) is added in addition to destination data (001 and 002) that has already been held.

TABLE 5

Destination Table Data (E00)

| Destination ID (E01) | Name (E02) | Protocol (E03) | Destination (E05) |
|---|---|---|---|
| 001 | Kato | FAX | 00366667777 |
| 002 | Yamada | FAX | 00388889999 |
| 003 | Suzuki | FAX | 00311112222 |
| 004 | Tanaka | FAX | 00344445555 |
| 005 | Sato | FTP | server.xyz.co.jp |

As described above, the image processing apparatus according to this embodiment performs, with respect to one or more pieces of stored destination information of the external apparatus, export by switching, based on the communication type regarding the destination information, whether or not to add the external line call number to a destination number included in the destination information. The image processing apparatus also performs, with respect to destination information obtained from the external apparatus, import of the destination information to the image processing apparatus by switching, based on the communication type regarding the destination information, whether or not to remove the external line call number from the destination number included in the destination information. According to this embodiment, this makes it possible to switch control when destination data is exported or imported in accordance with whether an apparatus which exports the destination data or an apparatus which imports the destination data is an apparatus which adds the external line call number automatically.

Second Embodiment

The second embodiment of the present invention will be described below. In this embodiment, an arrangement will be described in which whether or not to perform export by adding an external line call number when exporting destination table data is set. In the first embodiment described above, in accordance with whether each of an export apparatus and an import apparatus adds the external line call number automatically, whether or not to add the external line call number at the time of export is switched, and whether or not to remove the number at the time of import is switched. It is also possible, however, to create destination table data by a PC or the like to import. Therefore, in this embodiment, addition and removal of the external line call number can be selected by a user instruction. Note that a detailed description of the same arrangement as in the first embodiment described above will be omitted.

<Screen Example>

First, an operation screen when destination table data is exported from an MFP 101 will be described with reference to FIG. 9. An operation screen 900 is a screen for operating the MFP 101 remotely via a LAN 100 by using a browser mounted on a PC 104. At least information 901, information 902, and an operation key 903 are displayed on the operation screen 900.

The information 901 selects the destination table data to be exported. It is possible, in the MFP 101, to select at least one destination table out of destination tables 1 to 10. However, destination tables other than these may be included as choices. It is also possible to select a plurality of destination tables simultaneously. A user can select desired destination table data from choices displayed in a drop-down form.

The information 902 selects to add the external line call number when exporting the destination table data. The user can select whether or not to add the number from the choices displayed in the drop-down form.

The operation key 903 executes export of the destination table data. Upon selecting the operation key 903, destination table data stored in an HDD 214 of the MFP 101 is exported and saved in the PC 104. Note that a case in which an export instruction is executed for an MFP 102 is also the same, and thus a description thereof will be omitted.

<Export Processing Procedure>

Figure 9:
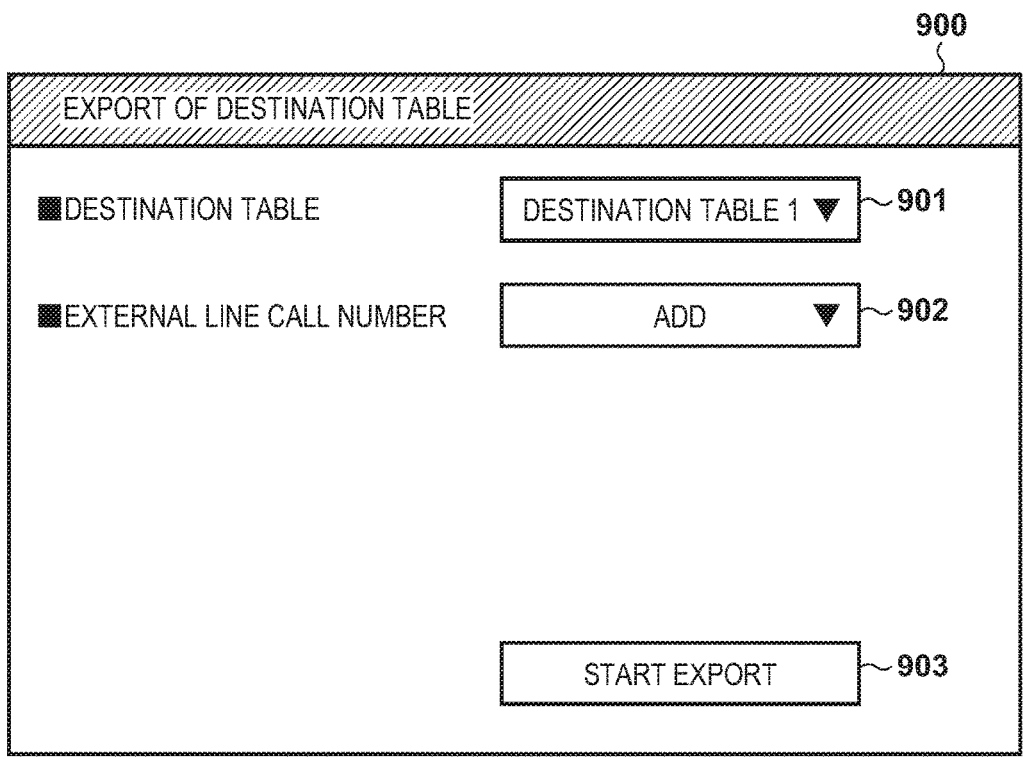
FIG. 9 is a view showing an operation screen of an MFP 101 according to an embodiment.
Figure 10:
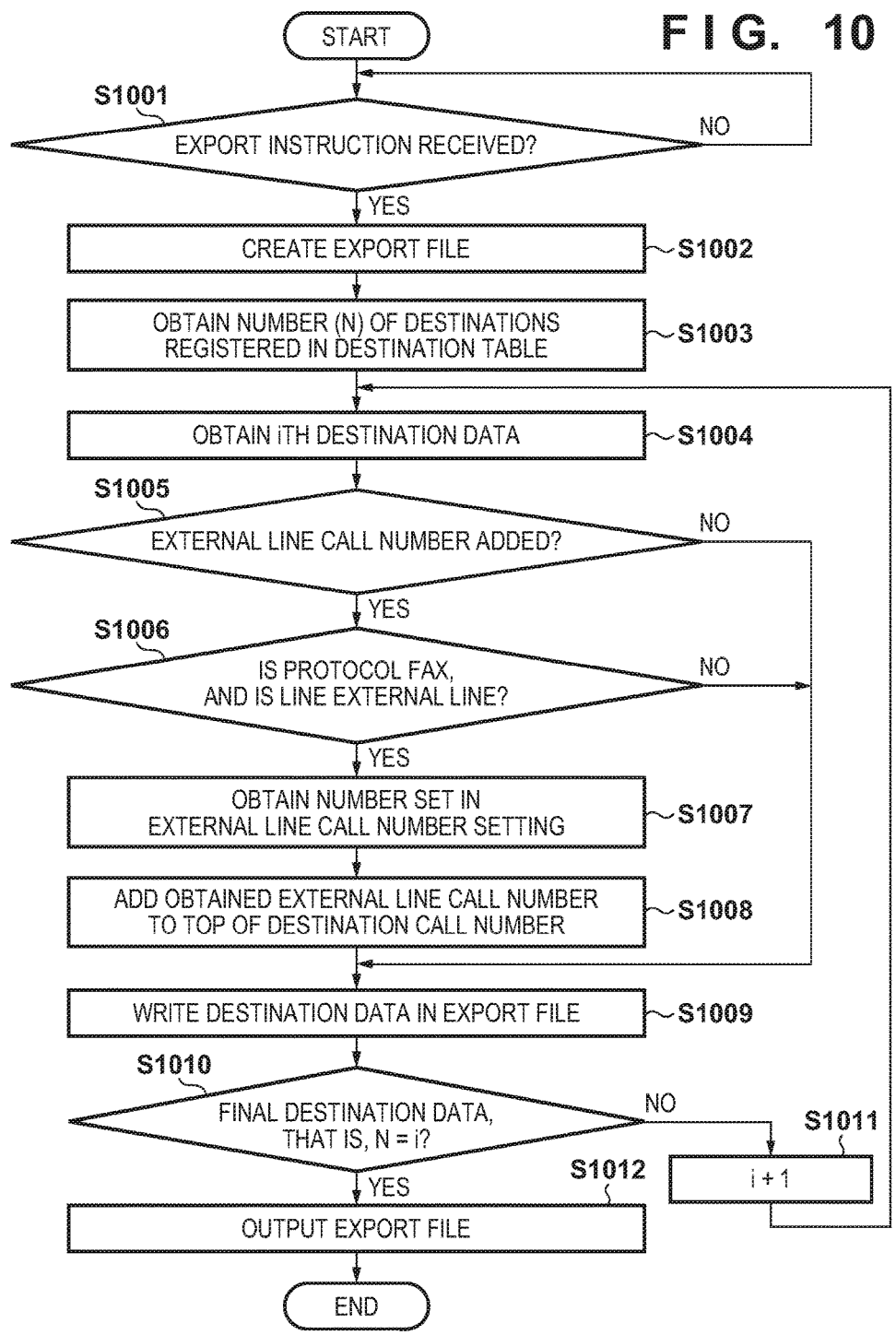
FIG. 10 is a flowchart showing the operation of the MFP 101 according to the embodiment.

A processing procedure when the operation key 903 of FIG. 9 is selected to export the destination table data will now be described with reference to FIG. 10. Respective operations (steps) shown in the flowchart of FIG. 10 are implemented by causing a CPU 211 of the MFP 101 to execute control programs stored in the HDD 214. Note that only a part different from the flowchart of FIG. 7 will be described here. That is, steps S1001 to S1004 and steps S1006 to S1012, respectively, correspond to steps S701 to S704 and steps S705 to S711, and thus a description thereof will be omitted.

In step S1005, the CPU 211 obtains setting information of whether or not to add an external line call number in the information 902 of FIG. 9 stored in the HDD 214. If the obtained setting information indicates that the number is added, the process advances to step S1006. If the information indicates that the number is not added, the process advances to step S1009. That is, as in the flowchart of FIG. 7, although whether or not to add the external line call number is switched depending on conditions of a protocol and whether a line is an external line or an extension line in step S1006, a determination in step S1005 is performed by giving higher priority than these conditions. Therefore, according to this embodiment, if the obtained setting information indicates that the number is not added, processing in steps S1007 and S1008 is skipped regardless of the conditions of the protocol, or whether the line is the external line or the extension line.

Note that a case in which an export instruction is executed for the MFP 102 is also the same, and thus a description thereof will be omitted. External line call number setting does not exist when the export instruction is executed for an MFP 103, skipping steps from S1005 to S1008.

<Screen Example>

An operation screen when destination table data is imported from the MFP 101 will now be described with reference to FIG. 11. An operation screen 1100 is an operation screen for operating the MFP 101 remotely via the LAN 100 by using the browser mounted on the PC 104. Information 1101, information 1102, information 1103, information 1104, and an operation key 1105 are displayed on the operation screen 1100.

The information 1101 selects the write destination of the destination table data to be imported. It is possible, in the MFP 101, to select at least one destination table out of destination tables 1 to 10. However, destination tables other than these may be included as choices. It is also possible to select a plurality of destination tables simultaneously. The user can select desired destination table data from choices displayed in the drop-down form.

The information 1102 is an information key which selects a method for writing the destination table data to be imported. In the MFP 101, overwrite can be selected after addition or deletion. Upon selecting the addition, import data is added after destination table data selected in the information 1101 when the destination table data is imported. Upon selecting the overwrite after the deletion, the destination table data selected in the information 1101 is deleted to add the import data.

The information 1103 designates the path of the destination table data saved in the PC 104. The information 1104 selects whether the protocol of the destination data is FAX, and a line removes an external line call number from the destination of an external line to import. The user can select a desired method from choices displayed in the drop-down form.

The operation key 1105 executes the import of the destination table data. Upon selecting the operation key 1105, the destination table data saved in the PC 104 is imported to the destination table data stored in the HDD 214 of the MFP 101 in accordance with the setting of the information 1102. Note that a case in which an import instruction is executed for the MFP 102 is also the same, and the same also applies except that the MFP 103 does not contain the information 1104. Thus, a description thereof will be omitted.

<Import Processing Procedure>

Figure 11:
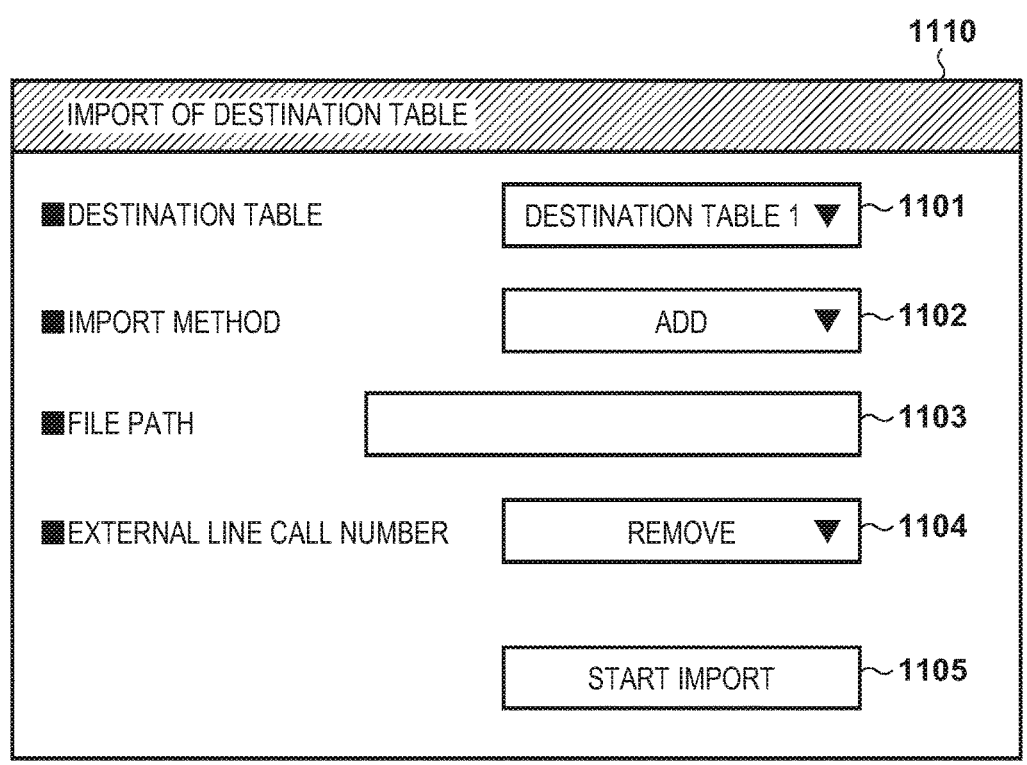
FIG. 11 is a view showing an operation screen of the MFP 101 according to the embodiment.
Figure 12:
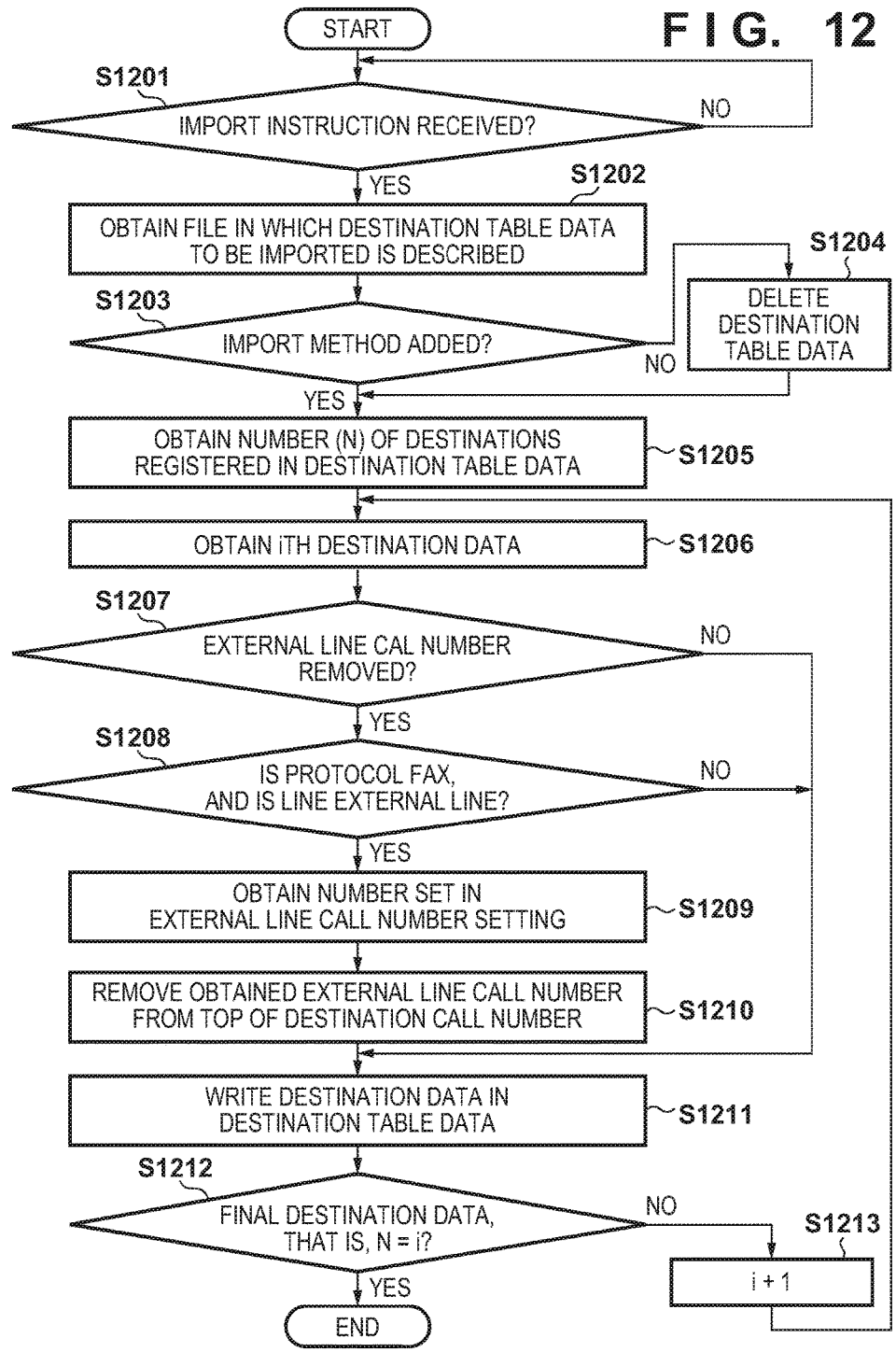
FIG. 12 is a flowchart showing the operation of the MFP 101 according to the embodiment.

A processing procedure when the operation key 1105 of FIG. 11 is selected to import the destination table data will now be described with reference to FIG. 12. Here, a flowchart is shown when the destination data exported from the MFP 101 is imported to the MFP 102. The same value as that in information 601 of FIG. 6 of the MFP 101 from which the destination table data is exported needs to be registered in the MFP 102 in advance. Respective operations (steps) shown in the flowchart of FIG. 12 are implemented by causing the CPU 211 of the MFP 102 to execute the control programs stored in the HDD 214. Note that only a part different from the flowchart of FIG. 8 will be described here. That is, steps S1201 to S1206 and steps S1208 to S1213, respectively, correspond to steps S801 to S806 and steps S808 to S813, and thus a description thereof will be omitted.

In step S1207, the CPU 211 obtains the selected value of the information 1104 in FIG. 11 and determines whether the obtained value is in the setting of removing an external line call number. If the value is in the setting of removing the number, the process advances to step S1208. If the value is in the setting of not removing the number, the process advances to step S1211. That is, as in the flowchart of FIG. 8, although whether or not to remove the external line call number is switched depending on conditions of a protocol and whether a line is an external line or an extension line in step S1208, a determination in step S1207 is performed by giving higher priority than these conditions. Therefore, according to this embodiment, if the obtained setting information is in the setting of not removing the external line call number, processing in steps S1209 and S1210 is skipped regardless of the conditions of the protocol, or whether the line is the external line or the extension line.

Note that a case in which an import instruction is executed for the MFP 101 is also the same, and thus a description thereof will be omitted. External line call number setting does not exist when the import instruction is executed for the MFP 103, skipping steps from S1207 to S1210.

As described above, according to this embodiment, control is switched by giving higher priority to the setting of whether or not to add an external line call number at the time of export or the setting of whether or not to remove an external line call number at the time of import, in addition to the first embodiment described above. This makes it possible to switch processing in accordance with a user demand while having the same effect as in the first embodiment described above.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-152291 filed on Aug. 2, 2016, which is hereby incorporated by reference herein in its entirety.

What is claimed is:

1. An image processing apparatus communicable with an external apparatus, the image processing apparatus comprising:
   a storage storing at least one destination number;
   at least one memory storing instructions; and
   at least one processor that, upon executing the instructions, causes the image processing apparatus to:
   receive number information used as an external line call number that is added automatically to a destination number to call at a time of external line transmission;
   set whether or not to add the external line call number in an export process for exporting the destination number stored in the storage to the external apparatus based on communication type of the destination number;
   perform the export process using information obtained by adding the external line call number to a beginning of the destination number stored in the storage, if a setting to add the external line call number has been performed, and
   perform the export process using the destination number stored in the storage without adding the external line call number, if a setting to not add the external line call number has been performed.

2. An image processing apparatus communicable with an external apparatus, the image processing apparatus comprising:
   a storage;
   at least one memory storing instructions, and
   at least one processor that, upon executing the instructions, causes the image processing apparatus to:
   set whether or not to remove information corresponding to an external line call number in an import process of a destination number based on communication type of the destination number;
   obtain, from the external apparatus, destination information;
   import, to the storage, a destination number obtained by removing the information corresponding to the external line call number from the obtained destination information, if a setting to remove the information corresponding to the external line call number has been performed, and
   import, to the storage, the obtained destination information without removing the information corresponding to the external line call number, if a setting to not remove the information corresponding to the external line call number has been performed.

3. The image processing apparatus according to claim 2, wherein the instructions further cause the image processing apparatus to perform an export process for exporting a destination number stored in the storage to the external apparatus.

4. A method for controlling an image processing apparatus communicable with an external apparatus and including a storage configured to store at least one destination number, the method comprising:
   receiving number information used as an external line call number that is added automatically to a destination number to call at a time of external line transmission;
   setting whether or not to add the external line call number in an export process for exporting the destination number stored in the storage to the external apparatus based on communication type of the destination number;
   performing the export process using information obtained by adding the external line call number to a beginning of the destination number stored in the storage, if a setting to add the external line call number has been performed, and
   performing the export process using the destination number stored in the storage without adding the external line call number, if a setting to not add the external line call number has been performed.

5. A method for controlling an image processing apparatus communicable with an external apparatus, the method comprising:
   setting whether or not to remove information corresponding to an external line call number in an import process of a destination number based on communication type of the destination number;
   obtaining, from the external apparatus, destination information;
   importing, to a storage, a destination number obtained by removing the information corresponding to the external line call number from the obtained destination information, if a setting to remove the information corresponding to the external line call number has been performed, and
   importing, to the storage, the obtained destination information without removing the information corresponding to the external line call number, if a setting to not remove the information corresponding to the external line call number has been performed.

6. A non-transitory computer-readable storage medium storing a computer program that causes a computer to execute respective steps in a method for controlling an image processing apparatus communicable with an external apparatus and including a storage configured to store at least one destination number, wherein the method includes:
   receiving number information used as an external line call number that is added automatically to a destination number to call at a time of external line transmission;
   setting whether or not to add the external line call number in an export process for exporting the destination number stored in the storage to the external apparatus based on communication type of the destination number;
   performing the export process using information obtained by adding the external line call number to a beginning of the destination number stored in the storage, if a setting to add the external line call number has been performed, and performing the export process using the destination number stored in the storage without adding the external line call number, if a setting to not add the external line call number has been performed.

7. A non-transitory computer-readable storage medium storing a computer program that causes a computer to execute respective steps in a method for controlling an image processing apparatus communicable with an external apparatus, wherein the method includes:

setting whether or not to remove information corresponding to an external line call number in an import process of a destination number based on communication type of the destination number;

obtaining, from the external apparatus, destination information;

importing, to a storage, a destination number obtained by removing the information corresponding to the external line call number from the obtained destination information, if a setting to remove the information corresponding to the external line call number has been performed, and importing, to the storage, the obtained destination information without removing the information corresponding to the external line call number, if a setting to not remove the information corresponding to the external line call number has been performed.

* * * * *